UNITED STATES PATENT OFFICE.

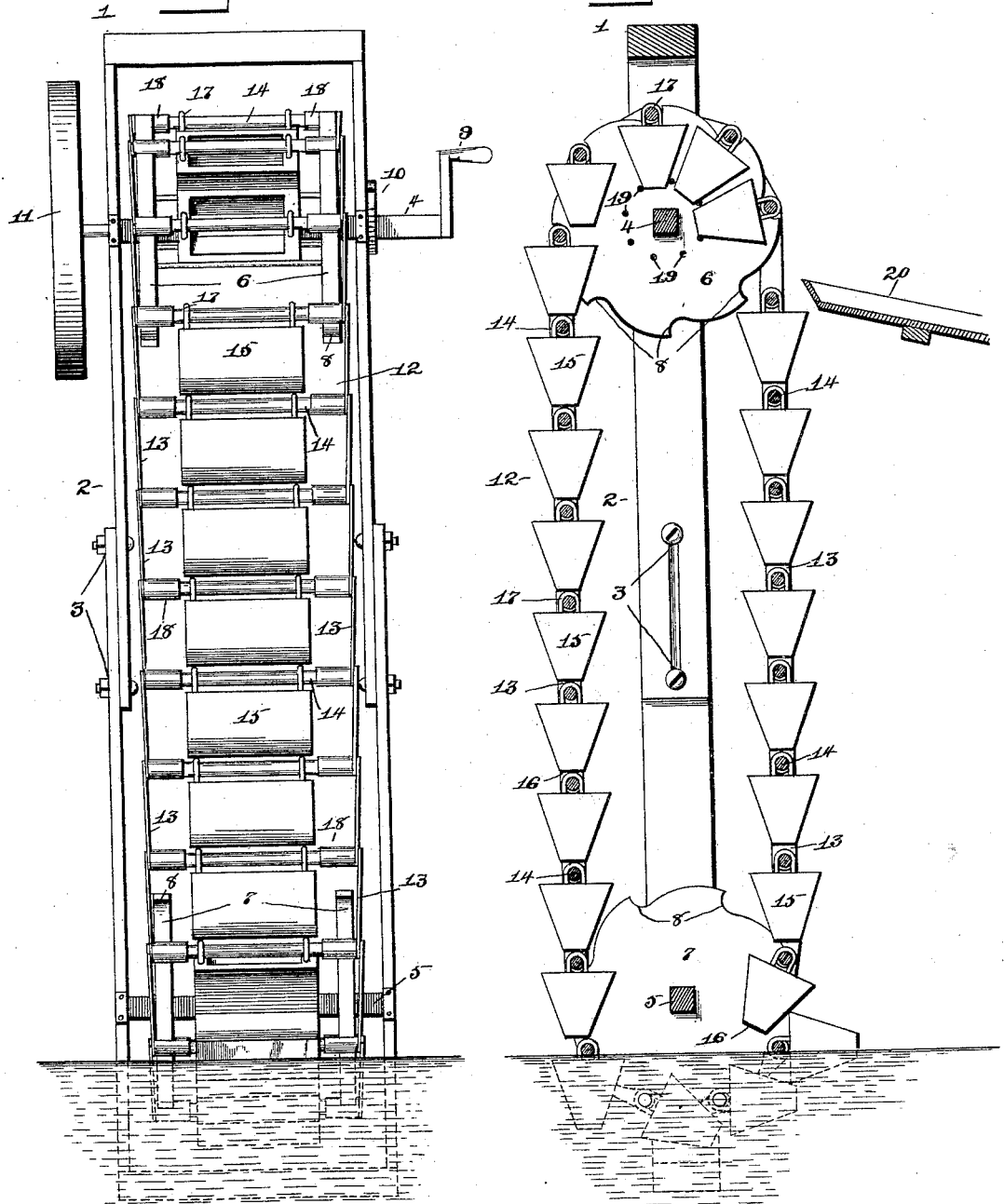

HILRY HARRIS, OF KREMMLING, COLORADO.

WATER-ELEVATOR.

SPECIFICATION forming part of Letters Patent No. 473,573, dated April 26, 1892.

Application filed August 5, 1891. Serial No. 401,728. (No model.)

*To all whom it may concern:*

Be it known that I, HILRY HARRIS, a citizen of the United States, residing at Kremmling, in the county of Grand and State of Colorado, have invented a new and useful Water-Elevator, of which the following is a specification.

My invention relates to improvements in water-elevators; and it has for its object to provide an improved construction and arrangement of devices for elevating water from a well, cistern, or a running stream to any place where water is desired to be elevated for purposes of irrigation or other uses, the invention being especially designed to improve the old endless-chain water-elevators; and with these objects in view the invention consists of a continuous line of loosely-suspended buckets carried by an endless-chain ladder, the whole device being constructed in the novel manner hereinafter more particularly described, illustrated in the accompanying drawings, and specifically pointed out in the appended claim.

In the accompanying drawings, Figure 1 is a front elevation of a chain water-elevator constructed in accordance with my invention. Fig. 2 is a vertical transverse sectional view of the same.

Referring to the accompanying drawings, 1 represents a vertical rectangular frame within which the details of my device are mounted. This frame is of an oblong rectangular shape, the sides 2 of which may be provided with suitable extension means 3, whereby the length of the frame may be increased or diminished, as desired, to accommodate the endless chain mounted therein or to regulate the tension thereof. Journaled within said frame near each end are the horizontal shafts 4 and 5, upon both of which shafts are rigidly secured the pairs of wheels 6 and 7, suitably spaced apart for the purposes to be mentioned and provided with a series of notches 8 along their periphery at regular intervals. The upper shaft 4 is provided outside of the frame on one side thereof with an operating-handle 9 and a pawl-and-ratchet device 10, whereby back movement or slipping is prevented, and the said shaft on the opposite side and outside of the frame is further provided with the ordinary drive-wheel 11. The endless chain 12 passes over and is operated by both pairs of wheels upon the upper and lower shafts. The endless chain consists of a series of side links 13, connected together at their meeting edges by cross bars or bolts 14, which bolts are engaged by the notched periphery of each wheel, and thus carries the chain around the same in its endless travel, while the side links are adapted to pass outside and along the edge of each wheel, and thereby avoids interference with the operation of the device. The buckets 15 may be made square or oblong around their upper edge or rim; but the sides thereof are converging to form a tapered bottom 16, the said buckets being loosely hung and suspended from the cross-bars or rounds 14 of the endless chain by means of the bails or loops 17, secured to the ends of the buckets and passing over said bars. The buckets are kept practically to the center of the chain and are kept out of contact with the sides of the wheel by means of short thimbles 18, secured loosely to each end of the cross-bars. By this construction it can be readily seen that during the revolution of the chain the loosely-suspended buckets always retain a vertical position during the ascent and descent of the same from and to the water's surface, and when they arrive to the upper pair of wheels the same pass between the same and under and beneath the lower pair of wheels.

The notched wheels mounted on the upper shaft are connected together and are provided between their inner faces and within the space between the same with the connecting trip-bars 19, arranged at regular intervals concentric with the shaft upon which the pairs of wheels are mounted, the function and object of said trip-bars being to engage the tapered bottom of the loosely-suspended buckets as they pass between the upper pair of wheels and tilt the bucket and empty the same of its contents into the trough or chute 20, arranged alongside of the device to conduct the elevated water away from the elevator, and when the buckets have been deprived and emptied of the water therein the lower end of the same becomes disengaged from the trip-bars and assumes a vertical position and descends into the water without carrying therein a quantity of air that will have to be forced therefrom by the water, and thus increase the power necessary to operate the elevator. The buckets on reaching the water's surface are thrown flat upon the side and drawn under and through the water by the lower pair of notched wheels. The operation repeats itself.

The frame within which the wheels and chain are mounted may be hinged or pivoted to the timbers arranged alongside of the stream or reservoir from which the water is drawn, while the lower end is designed to rest or float within the water, so that the same will rise or fall, according to the rise or fall in the water, and thus avoids the extra pull of the buckets through deep water, the operation of the elevator not being hindered by the same assuming other positions than the vertical.

Having thus described my invention, what I claim, and desire to secure by Letters Patent, is—

In a chain-pump, the combination of a loosely-suspended vertically-adjustable frame, the upper and lower pairs of notched wheels mounted in the upper and lower ends of said frame, an endless chain, the cross-bars connecting the links of said chain, opposite thimbles on each end of the cross-bars alongside of the links and engaged by the notched periphery of said wheels and the said links passing along outside of the same, tapered buckets loosely suspended from the cross-bars of said chain between said thimbles and adapted to pass through and between the upper pair of wheels, and a series of concentrically-arranged trip-rods located within the space between the upper pairs of wheels and engaging the tapered bottom of the loosely-suspended buckets, substantially as set forth.

In testimony that I claim the foregoing as my own I have hereto affixed my signature in presence of two witnesses.

HILRY HARRIS.

Witnesses:
   THOMPSON HERRIOTT,
   THOMAS BUCKINGHAM.